United States Patent [19]

Hoffman et al.

[11] 4,028,670

[45] June 7, 1977

[54] FETCH INSTRUCTION FOR OPERAND ADDRESS CALCULATION

[75] Inventors: Roy Louis Hoffman, Pine Island; William George Kempke; Frank Gerald Soltis, both of Rochester, all of Minn.

[73] Assignee: International Business Machines Corporation, Armonk, N.Y.

[22] Filed: Feb. 6, 1976

[21] Appl. No.: 655,646

[52] U.S. Cl. ............................................ 340/172.5
[51] Int. Cl.² ........................................... G06F 9/06
[58] Field of Search ...................... 340/172.5; 445/1

[56] References Cited

UNITED STATES PATENTS 3,736,363  5/1973  Beers et al. ...................... 340/172.5
3,736,567  5/1973  Lotan et al. ...................... 340/172.5

OTHER PUBLICATIONS

IBM Tech. Disclosure Bulletin – Hardware–Aided Simulator Program – S. G. Tucker et al. – vol. 7, No. 4, 9/64; pp. 289–292.

Primary Examiner—Harvey E. Springborn

[57] ABSTRACT

A special directly executable instruction, Fetch Instruction Operand Address (FIOA) is accessed in response to encountering a complex non-directly executable instruction. Execution of the FIOA instruction causes generation of control signals for address calculation of the operands in the non-directly executable instruction by the same I phase hardware used by other directly executable instructions.

6 Claims, 9 Drawing Figures

FETCH INSTRUCTION FOR OPERAND ADDRESS CALCULATION

BACKGROUND OF THE INVENTION

1. Field of the Invention

This invention relates to computer systems and more particularly to instruction handling in computer systems and still more particularly to the I phase of instruction handling.

The invention finds particular utility in computer systems where the instruction set includes complex instructions which are not directly executable by the computer hardware. These complex instructions are sometimes referred to as "soft" instructions because they are not directly executable. The complex instructions are executed by executing sequences of simple instructions which are executable by the hardware. The present invention serves to eliminate certain sequences of simple instructions necessary to execute the complex instructions.

2. Description of the Prior Art

The prior art, such as set forth in the IBM Technical Disclosure Bulletin Vol. 7, No. 4, September 1964, Page 289, teaches the concept of utilizing a single instruction to replace a sequence of instructions that a simulator would use to access and update the simulator instruction counter, to convert the address format of the simulator machine to the address format of the simulating machine, to fetch the next instruction of the simulated program, to perform any indexing required for the simulated instruction, to convert the address portion of the simulated instruction to an address format of the simulating machine for obtaining an operand and interpreting the simulated instruction operation code to cause a branch to the appropriate instruction routine of the simulating machine to execute the instruction.

The prior art also teaches a computer control arrangement where non-directly executable instructions are executed by a sequence of directly executable instructions. Such prior art is represented by IBM Technical Disclosure Bulletin, Vol 14, No. 1, June 1971, Page 298. Hence, the concept of extending the apparent hardware instruction set of a computer by simulating complex instructions with sequences of simple, directly executable instructions is known. The use of special instructions and hardware for interpretation of the complex or non-directly executable instructions is also known to the extent for dividing the simulated instruction into its constituent parts in a form interpretable by a simulating program.

The prior art does not teach an arrangement of invoking a single, special, directly executable instruction to compute operand addresses for operands of a non-directly excutable instruction utilizing the same hardware used for computing operand addresses for directly executable instructions. Heretofore it has been the practice to use sequences to directly executable instructions to compute the operand addresses of operands for non-directly executable instructions or special purpose hardware was used. The use of sequences of directly executable instructions degrades performance and is not desireable. The use of special purpose hardware, of course, entails additional expense and is a more complex arrangement than the present invention. The principal objects of the invention are to provide improved apparatus for computing operand addresses for fetching operands of non-directly executable instructions which:

a. utilizes the same hardware used for computing operand addresses for directly executable instructions, b. is relatively inexpensive for the function performed, and c. does not substantially degrade performance.

These objects are achieved by using a special directly executable instruction for calculating operand addresses of simulated instructions. The directly executable special instruction uses the same instruction fetch or I phase hardware as used by other directly executable instructions. The operand address specification fields of simulated instructions are gated through the same address generation circuitry as are the operand address specification fields of directly executable instructions. The non-directly executable instructions are assigned operation code values from the same sequence as directly executable instructions. The number of operands in simulated instruction is determined by the same logic circuitry as for directly executable instructions.

DESCRIPTION

Figure 1:
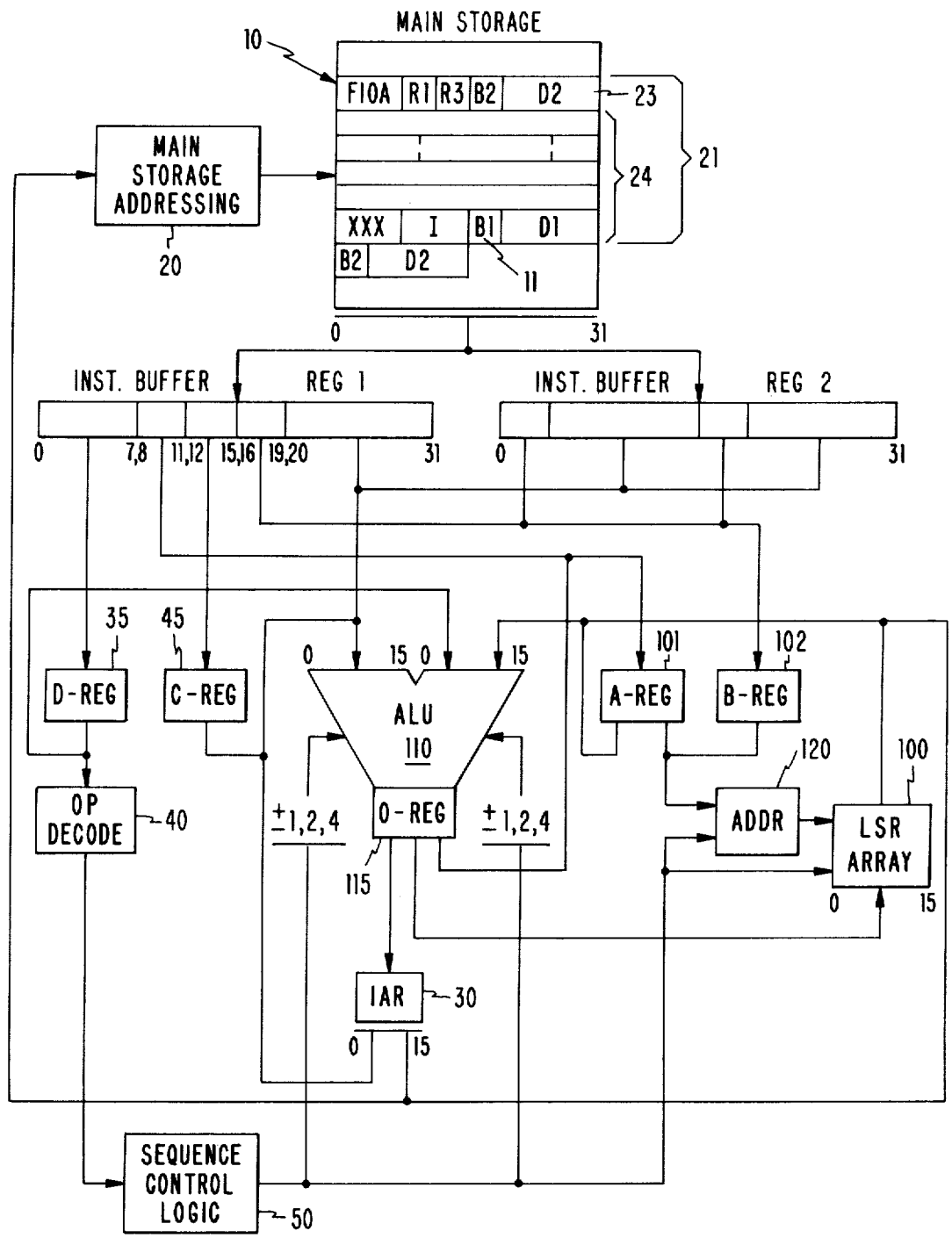
FIG. 1 is a block diagram of a stored program computer incorporating a preferred embodiment of the present invention.

With reference to the drawings and particularly to FIG. 1 the invention is illustrated by way of example as being incorporated in a stored program computer having a main storage 10 for storing instructions and data at addressable locations. In this particular example the addressable locations are at 32 bit intervals. These 32 bit intervals are considered to be words consisting of 4 bytes where each byte contains 8 bits. Although 4 bytes are retrieved on each storage access, instructions vary in byte length. Main storage 10 is conventional and is addressed by main storage addressing 20 which receives an address from instruction address register (IAR) 30.

An instruction retrieved from storage 10 is entered into a 32 bit instruction buffer register 1. If the instruction fetched is longer than 4 bytes, as determined by an operation to be described later herein, the remaining bytes of the instruction are entered into 32 bit instruction buffer register 2. Each instruction has an OP code contained in the high order bits 0–7 of the instruction. This OP code is entered into a D register 35 for facilitating analysis of the OP code by OP decode logic 40.

OP decode logic 40 includes conventional digital logic circuitry in essence for determining the length of the instruction and the operation to be performed. In this embodiment, OP decode logic 40 provides a 16 bit address to sequence control logic 50 which includes a control store containing control words which are used to actually cause the fetching of additional bytes of the instruction if there are any and to determine to the instruction is executable or non-executable.

Figure 2:
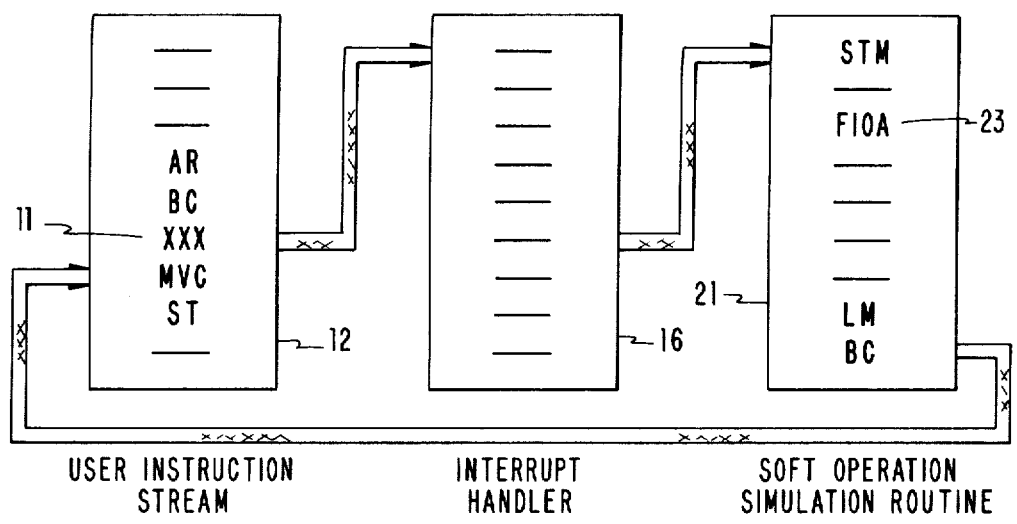
FIG. 2 is a schematic diagram illustrating program logic flow.

If the instruction is a non-executable instruction, the operation switches to an interrupt handler routine as illustrated in FIG. 2. In FIGS. 1 and 2 instruction 11 in the user instruction stream is a non-executable instruction. When it is decoded, the sequence control logic 50 switches to an interrupt handler illustrated by block 16 which upon completing its operation switches to a soft OP code simulation routine illustrated by block 21.

Figure 3:
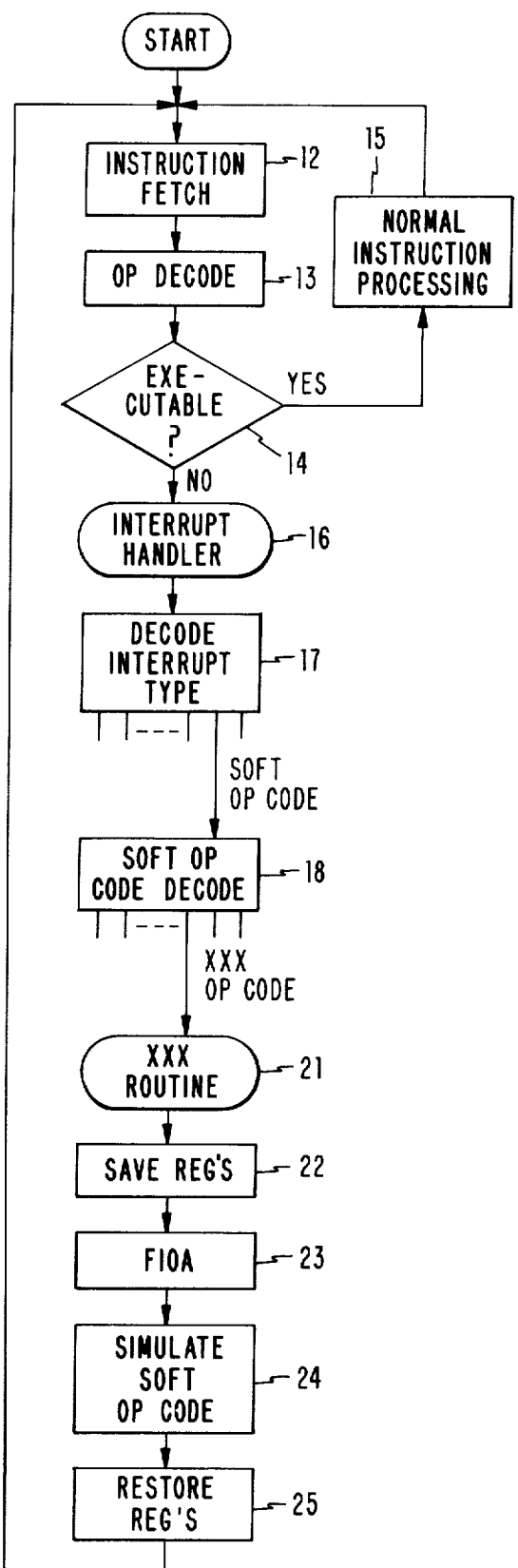
FIG. 3 is a flow chart illustrating program logic flow.

In FIG. 3 the instruction fetch operation is illustrated in flow diagram form by block 12. The OP decode operation follows and it is illustrated by block 13. A test, block 14, is made to determine if the instruction is an executable or non-executable instruction. If it is an executable instruction normal instruction processing takes place as represented by block 15; if not, the operation switches to interrupt handler 16. The interrupt type is determined, block 17, and upon detecting that a soft OP code caused the interrupt, the soft OP code is decoded, block 18. Control then transfers to the soft operation simulation routine 21.

Routine 21 saves the contents of the registers to be used, block 22; executes an FIOA instruction, block 23; performs the operation specified by the soft OP code, block 24; restores the saved contents into the registers used, block 25; and returns control to the fetching of the instruction following the non-executable instruction.

Various implementations are available for causing the transfer of control to the soft operation simulation routine after a non-executable instruction is encountered. Suitable implementations are set forth in IBM Technical Disclosure Bulletin, Vol 18, No. 7, December 1975, Page 2250 and are incorporated herein by reference.

Figure 4:
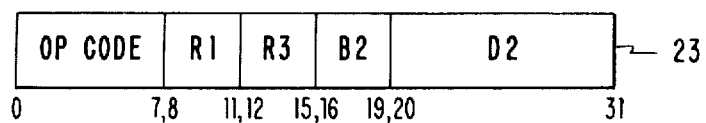
FIG. 4 is a diagram illustrating the format of an FIOA instruction.

The FIOA instruction 23 is a four byte executable instruction and has a format as shown in FIG. 4. Bits 0–7 represent the OP code. Bits 8–11 and 12–15 are addresses for addressing general registers in a stack of local storage registers (LSR's) 100 into which the computed operand addresses are to be entered. Bits 16–19 identify a general register of registers 100 whose contents are to be combined with bits 20–31 representing a displacement field to form the address of the non-executable instruction in main storage 10.

Figure 6:
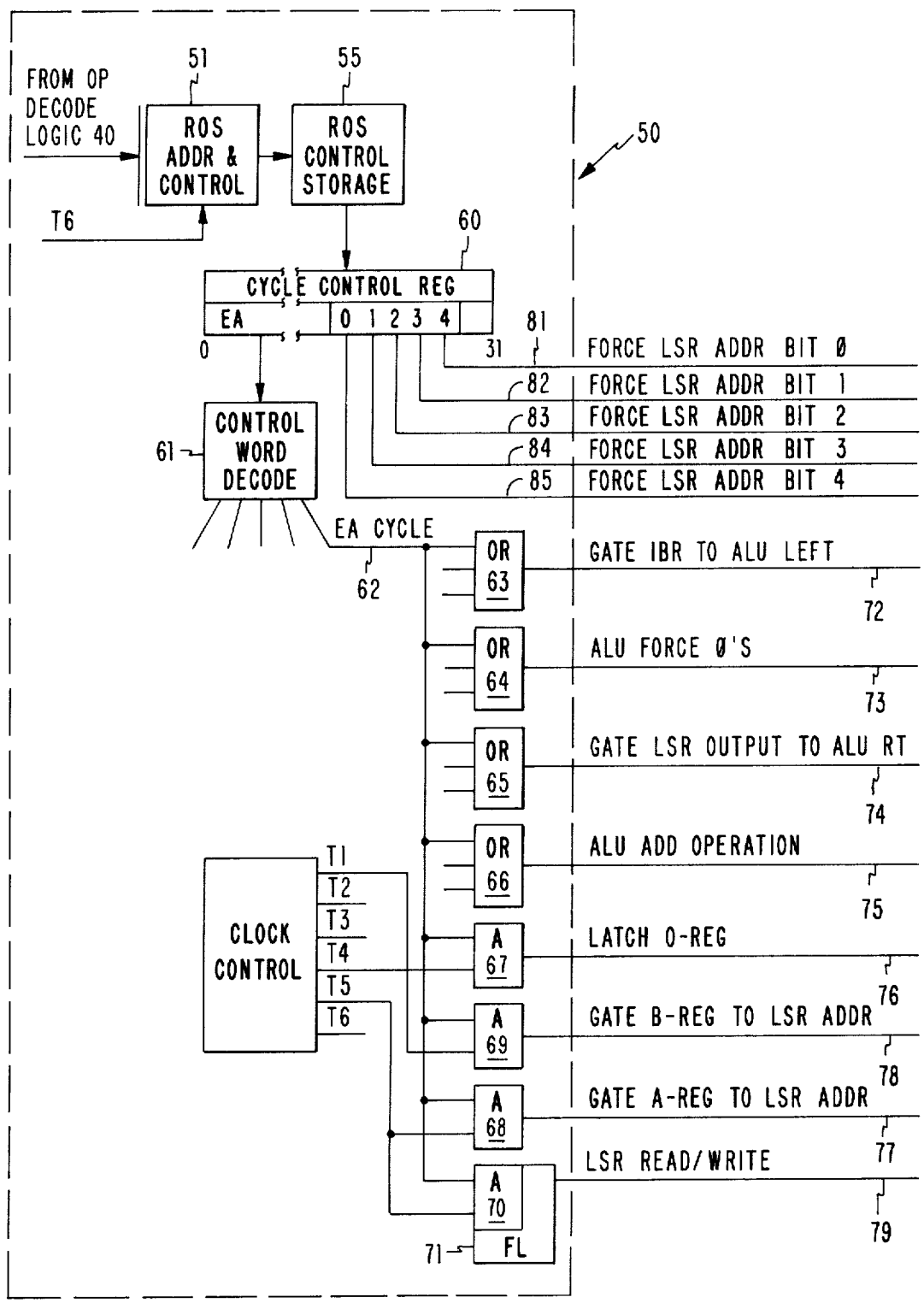
FIG. 6 is a schematic logic diagram showing details of the sequence control block.

The FIOA instruction is accessed by transferring the contents of IAR 30 into main storage address register 20. This is step 1 of FIG. 8. The address in IAR 30 was set up during execution of the previous instruction of the soft operation simulation routine 21. The 4 bytes of the FIOA instruction 23 are transferred from storage 10 into instruction buffer register 1. This is step 2 of FIG. 8. The OP code, bits 0–7 after being transferred to register 35, is decoded by OP decode logic 40, which upon decoding the OP code, provides an address to an address register 51, FIG. 6, for addressing a control word in read only control storage 55. This is step 3 of FIG. 8. The control word is transferred into cycle control register 60 and is decoded by control word decode logic 61. The first control word accessed is decoded to provide signals for determining instruction length. The first two high order bits of the OP code are transferred from register 35 into the low order side of arithmetic and logic unit (ALU) 110. A value of 1 is substracted within ALU 110 and the result is tested. A result of zero indicates that the instruction is a 4 byte instruction. A negative result indicates that the instruction is a 2 byte instruction. A positive result is indicative that the instruction is greater than 4 bytes. If a positive result occurs, the IAR 30 is incremented by four under control of sequence control logic 50 via ALU 110 and output register 115. The new value in IAR 30 is transferred to address register 20 and another storage access is made to transfer the remaining bytes of the instruction from storage 10 into instruction buffer register 2.

In the instance of the FIOA instruction, the result of the substraction is zero. Hence, the complete instruction has been transferred from storage 10 to the instruction buffer register 1.

Another control word is read out of control storage 55 and entered into cycle control register 60. This control word functions to determine if the FIOA instruction is an executable or non-executable instruction. The control word decode logic upon decoding this control word provides signals which in essence indicate that the FIOA instruction is an executable instruction. These signals cause the IAR 30 to be incremented by four via ALU 110 and register 115. This is step 4 of FIG. 8. The incremented value in IAR 30 is for addressing the next instruction in main storage 10 to be executed.

Figure 5A:
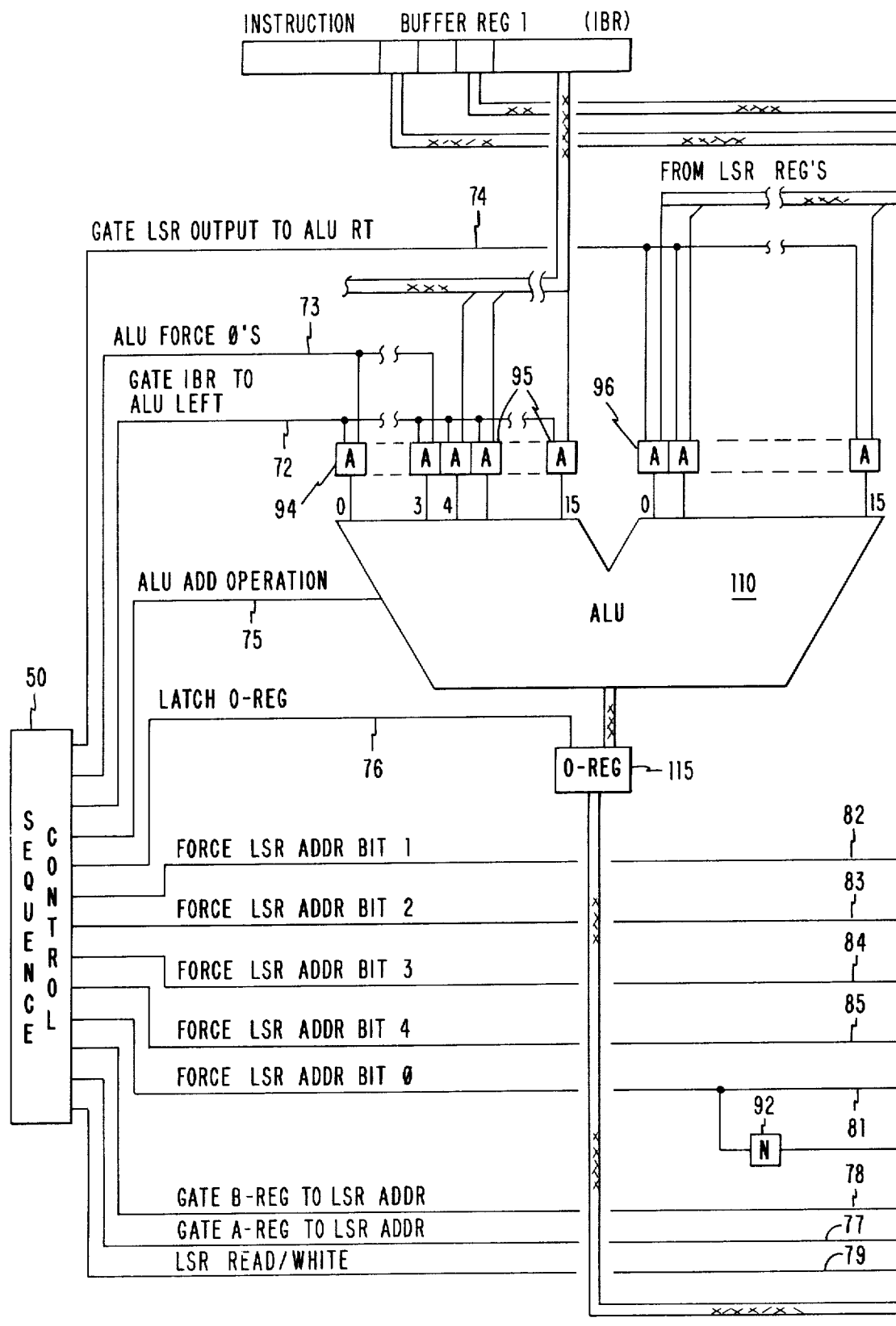
FIGS. 5a and 5b taken together with FIG. 5a disposed to the left of FIG. 5b are a schematic logic diagram of the controls for operand address calculation.
Figure 5B:
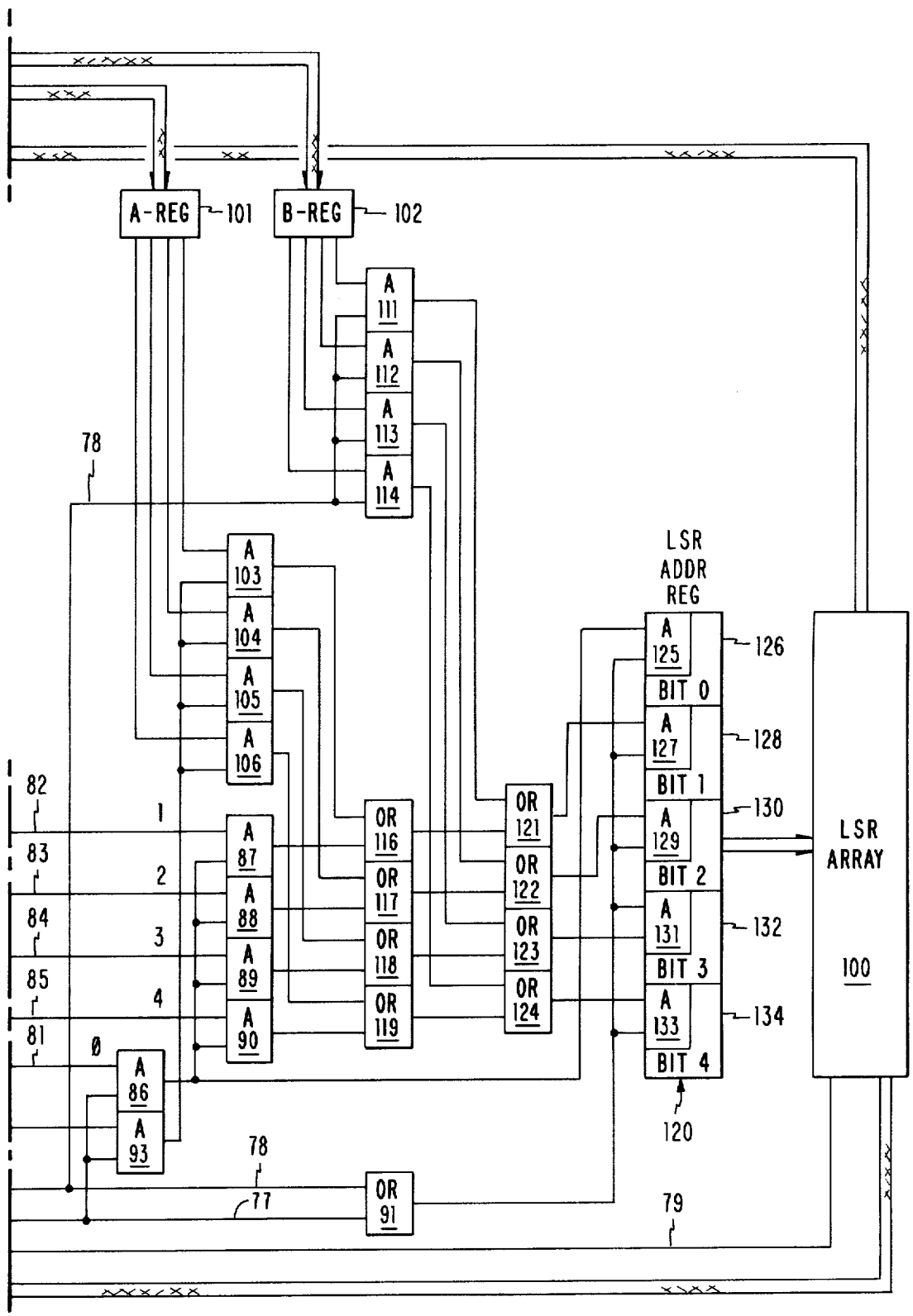
Figure 7:
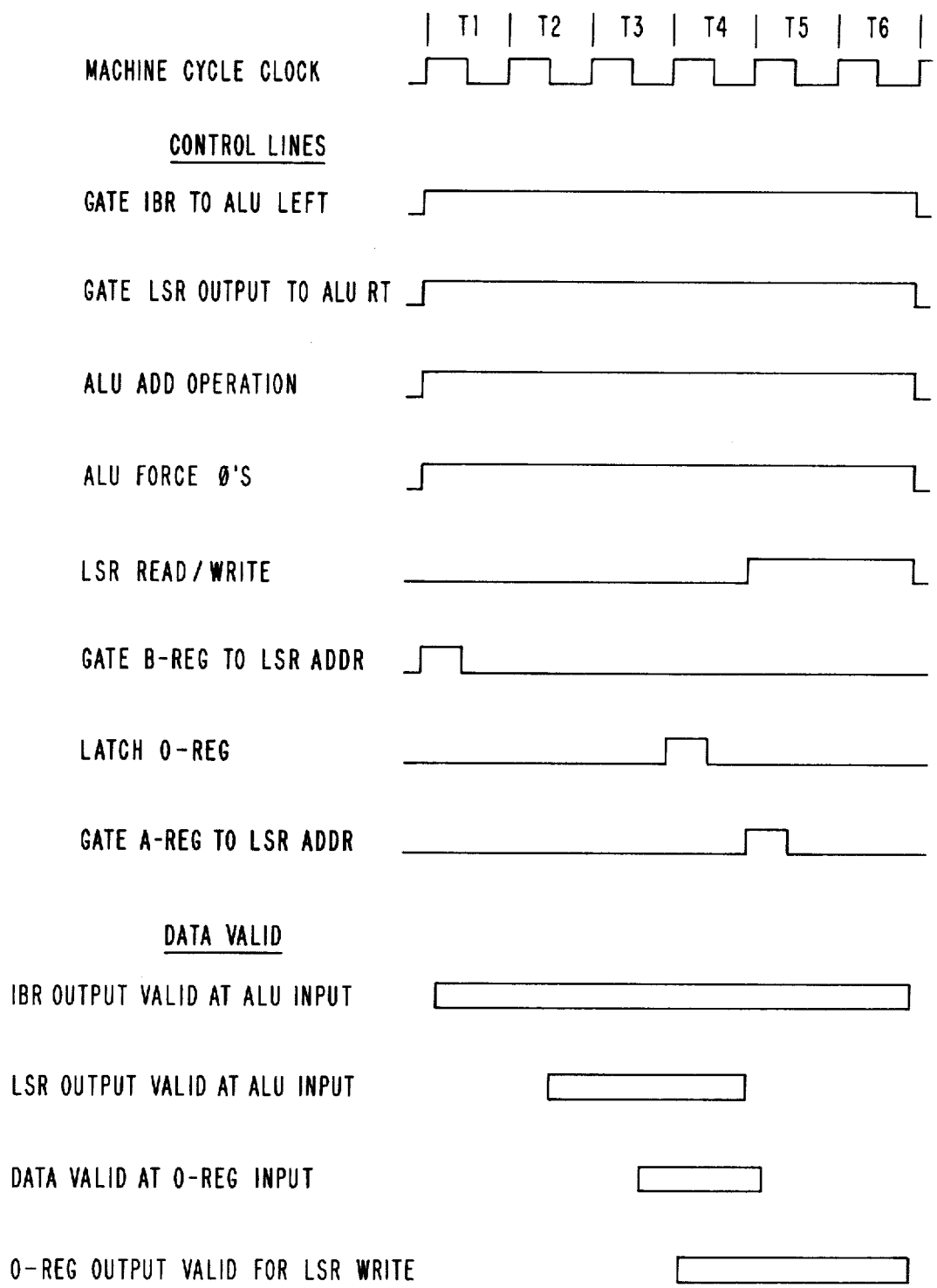
FIG. 7 is a time state diagram illustrating I-fetch and E cycles.

Each machine cycle as shown in FIG. 7 consists of six clock times T1-T6. Control storage 55 is accessed and register 60 is loaded at T6 time so as to provide control signals for the next machine cycle. Control word decode logic 61 in FIG. 6 determines the type of machine cycle and gates the appropriate control lines. Control line 62 from decode logic 61, when active, indicates an EA cycle (effective address cycle). This control line 62 is applied to OR circuits 63–66 inclusive and to AND circuits 67–70 inclusive. OR circuits 63–66 inclusive pass signals on lines 72–75 respectively for controlling the operation of ALU 110, FIG. 5a. AND circuit 67 provides an output on line 76 for latching output register 115. AND circuits 68 and 69 provide signals on lines 77 and 78 for gating the contents of registers 101 and 102, respectively to LSR address register 120, FIGS. 5a and 5b. The output of AND circuit 70 is connected to set latch 71. The set output of latch 71 is on line 79 and provides a LSR READ/WRITE signal which is applied to LSR's 100 for controlling reading and writing of data in these registers.

Sequence control logic 50 also provides signals on lines 81–85 inclusive for forcing the LSR address bits to states as determined by bits in the control word in register 60. Lines 81–85 inclusive are applied to AND circuits 86–90 inclusive respectively. The output of AND circuit 86 is used to condition AND circuits 87, 88, 89, and 90 and is also an input to AND circuit 125 which is connected to set bit 0 latch 126 of LSR address register 120. AND circuits 87, 88, 89, and 90 feed AND circuits 127, 128, 131, and 133 respectively via groups of OR circuits 116–119 and 121–124 to set latches 128, 130, 132 and 134 for bits 1, 2, 3, and 4 of register 120.

AND circuits 125, 127, 129, 131, and 133 are conditioned by the output of OR circuit 91 which receives the Gate A-Reg to LSR ADDR and the Gate B-Reg to LSR ADDR signals on lines 77 and 78.

Register 120 can also be set with the contents of registers 101 or 102. The contents of register 101 are passed via AND circuits 103, 104, 105 and 106 and the tow groups of OR circuits 116-119 and 121-124 to register 120. AND circuits 103, 104, 105, and 106 are conditioned by the output of AND circuit 93 which has inputs from inverter 92 and line 77. The contents of register 102 are passed via AND circuits 111-114 and the group of OR circuits 121-124 to register 120. AND circuits 111-114 are conditioned by the signal on line 78.

With the IAR 30 updated, the sequence control logic 50 causes bit positions 8-11 (R1) of instruction buffer register 1 to be gated to A register 101, bit positions 12-15 (R3) are gated to C register 45 and bit positions 16-19 (B2) are gated to B register 102. This is step 5 of FIG. 8. The sequence control logic 50 then causes the contents of B register 102 to be gated to the LSR address register 120, in the manner previously described, for addressing LSR registers 100. The contents of the LSR register addressed are gated into the right side of ALU 110 by the signal on line 74 which conditions AND circuits 96. Simultaneously bit positions 20-31 of instruction buffer register 1 are gated to the left side of ALU 110 via AND circuits 95 which are conditioned by the signal on line 72. The four high order bit positions into the left side of ALU 110 are forced to zeros by conditioning AND circuits 94 with the signal on line 73. An add operation is performed in ALU 110 and the results are latched in register 115 and then gated therefrom into an operand address register contained in the stack of LSR registers 100 and selected by the address furnished from register 101. This is step 6 of FIG. 8.

The operand register in LSR's 100 now contains the computed address of the soft instruction residing in main storage 10. The contents of this operand register are gated directly into main store address register 20 to address main storage 10. This is step 7 of FIG. 8.

Figure 8:
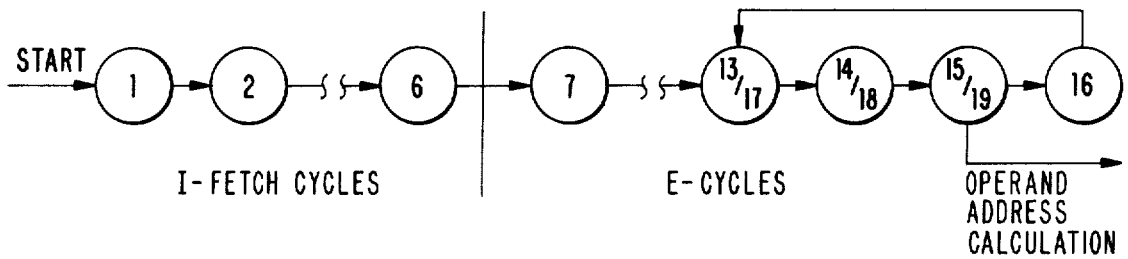
FIG. 8 is a timing diagram.

Steps 2 and 3 of FIG. 8 are repeated to fetch the first 4 bytes of the soft instruction. This constitutes steps 8 and 9 of FIG. 8. The first 4 bytes are placed in instruction buffer register 1. The OP code is loaded into D register 35 and the length of the soft instruction is determined in a manner as previously described. This time; however, the result of subtracting 1 from the first two bits of the OP code is positive. Hence, the soft instruction is greater than 4 bytes.

The contents of the operand address register in the LSR stack 100 are gated to the right side of ALU 110 incremented by 4 and gated back into the operand address register in the LSR's 100. This is step 10 of FIG. 8. The incremented value in the operand address register in LSR's 100 is then gated directly to the main storage address register 20. This is step 11 of FIG. 8. The 4 bytes containing the last 2 bytes of the soft instruction are read from main storage 10 and gated into the instruction buffer register 2. The entire soft instruction has now been retrieved from storage 10. Step 12 of FIG. 8 is now completed.

Bit positions 16-19 of the instruction buffer register 1 are gated to the B register 102. The first operand address of the soft instruction is computed in the manner described in step 6. The result is gated from register 115 into the register of the LSR's 100 addressed by the address transferred into register 120 from A register 101. This is step 14 of FIG. 8.

The contents of A register 101 are gated to the right side of ALU 110. Simultaneously, the contents of the C register 45 are gated to the left side of ALU 110. A compare operation is performed by doing an exclusive OR operation in ALU 110. If the comparison indicates that the values are equal, then all of the operand addresses of the soft instruction have been computed, otherwise, there are still more operand addresses to be computed. This is step 15 of FIG. 8.

Assuming that the comparison was unequal, the contents of the A register 101 are gated to the right side of ALU 110, incremented by one and the result is gated from register 115 back into the A register 101. This is step 16 of FIG. 8.

Steps 17, 18 and 19 of FIG. 8 are then performed by repeating steps 13, 14, and 15 of FIG. 8 using the second operand fields. The loop from step 16 back to step 13 would be repeated until all operand addresses are computed. When this occurs, execution continues by performing the function called for by the OP code in the soft instruction.

What is claimed is:

1. In a computer system having storage for storing executable and non-directly executable instructions and operands, said directly executable instructions including for every non-directly executable instruction a predetermined directly executable instruction having bit fields for performing instruction fetch phase and operand address calculation for an associated non-directly executable instruction, and a central processing unit for fetching and executing instructions from storage, the improvement comprising:

identifying means within said central processing unit for identifying non-directly executable instructions fetched from storage, means responsive to said identifying means indentifying a non-directly executable instruction for retrieving from storage an associated predetermined directly executable instruction having bit fields for performing instruction fetch phase and operand address calculation of said identified non-directly executable instruction, and means responsive to bits in said bit fields of said fetched predetermined directly executable instruction to re-fetch said identified non-directly executable instruction, to compute operand addresses for operands in said non-directly executable instruction as specified in said predetermined directly executable instruction and to store said computed operand addresses to facilitate retrieval of said operands.

2. The computer system of claim 1 wherein said means responsive to said bits in said bit fields of said associated predetermined directly executable instruction is the same means in said central processing unit for computing operand addresses and storing computed operand addresses for other directly executable instructions.

3. The computer system of claim 1 wherein said bit fields in said associated predetermined directly executable instruction for re-fetching said identified non-directly executable instrucion include a base bit field for addressing a register containing storage address bits and a displacement bit field to be combined with said storage address bits and thereby form a storage address for re-fetching said identified non-directly executable instruction.

4. The computer system of claim 1 wherein said bit fields in said associated predetermined directly executable instruction for computing said operand addresses include a first bit field having bits for addressing a register for storing first computed operand address bits for addressing storage to fetch a first operand to be used during simulated execution of said identified non-directly executable instruction and a second bit field having bits for addressing a register for storing last computed operand address bits for a last operand to be used during simulated execution of said identified non-directly executable instruction.

5. The computer system of claim 4 further comprising selective operable means for incrementing said first bit field bits to form incremented register address bits for addressing another register for storing another operand address bits for addressing said storage to fetch another operand to be used during said simulated execution of said identified non-directly executable instruction if said second bit field address bits are greater than said incremented register address bits.

6. In a computer system having an addressable storage for storing directly executable and non-directly executable instructions and operands and directly executable instructions including for every non-directly executable instruction a predetermined directly executable instruction having bit fields for performing instruction fetch phase and operand address calculation for an associated non-directly executable instruction, and a central processing unit, said central processing unit including first register means for storing directly executable and non-directly executable instructions fetched from said addressable storage, means for decoding said directly executable and non-directly executable instructions to determine the type of instruction and the operation to be performed, second register means for receiving portions of said instruction stored in said first register means, a stack of addressable registers, stack register addressing means and arithmetic and logic means, the improvement comprising means within said decoding means for identifying non-directly executable instructions fetched from storage, means reponsive to identification of a non-directly executable instruction for retrieving from said storage an associated predetermined directly executable instruction having first bit fields for defining the storage location of said identified non-directly executable instruction and second bit fields for defining stack register addresses for selecting stack registers to store calculated operand addresses of operands to be used during simulated execution of said identified non-directly executable instruction, means responsive to bits in said first bit fields in said associated predetermined directly executable instruction to form an address for re-fetching said identified non-directly executable instruction from storage, means for examining bits in said second bit fields in said associated predetermined directly executable instruction to form addresses for addressing said stack of addressable registers under conditions defined by the bits in said second bit fields, and means for transferring said formed addresses to said stack register addressing means whereby stack registers are selected for storing addresses of operands computed from address date in said re-fetched non-directly executable instruction during simulated execution thereof.

* * * * *